United States Patent [19]
Carroll, Jr. et al.

[11] Patent Number: 5,841,423
[45] Date of Patent: Nov. 24, 1998

[54] MULTIFUNCTION SPACE BAR FOR VIDEO SCREEN GRAPHICS CURSOR CONTROL

[76] Inventors: George L. Carroll, Jr., 16 E. Olive St., Arlington Hts., Ill. 60004; Michael A. Slavin, 4440 PGA Blvd. Ste. 402, Palm Beach Gardens, Fla. 33410

[21] Appl. No.: 578,846

[22] Filed: Dec. 26, 1995

Related U.S. Application Data

[63] Continuation-in-part of Ser. No. 656,573, Feb. 15, 1991, Pat. No. 5,479,192.

[51] Int. Cl.$^6$ .................................................. G09G 5/00
[52] U.S. Cl. ........................ 345/168; 345/173; 345/157
[58] Field of Search .................................. 345/168, 169, 345/170, 171, 173, 157, 160, 163, 167, 184; 341/22, 23; 400/472, 473; 74/471 XY, 471; 178/18, 19

[56] References Cited

U.S. PATENT DOCUMENTS

| | | | |
|---|---|---|---|
| 5,305,017 | 4/1994 | Gerpheide | 345/168 |
| 5,416,498 | 5/1995 | Grant | 345/168 |
| 5,479,192 | 12/1995 | Carroll, Jr. et al. | 345/168 |

*Primary Examiner*—Xiao Wu
*Attorney, Agent, or Firm*—McHale & Slavin

[57] ABSTRACT

A multifunction space bar for control of a video screen graphics cursor for replacement of, or as a supplement to, a second peripheral pointing device without keyboard modification. The device is a conventional space bar replacement and fits within the confines of conventional keyboards allowing the retro-fit of existing keyboards. The device is capable of supplying information signals determining rotational, sliding, and switch depression movements for control of video screen graphics cursor on a microprocessor based computer system having bus input control electronics for receipt of supply information signals. The device utilizes a positioner slidably secured to a cylindrical bar whereby rotation of the positioner generates a directional signal control of the graphic cursor along the y-axis. Slidable movement of the positioner longitudinally along the length of the cylindrical bar generates a directional signal for control of the graphic cursor along the x-axis. Both signals can be operated simultaneously. A plurality of switches are placed on the front of the device's support structure providing mouse button emulation and disabling/enabling for operation as a supplemental device. The device alternatively supplies information signals without a slidable positioner, and in certain configurations without a cylindrical bar, by employing a touch sensitive motion or position detection device. The device is usable in a broad spectrum of computer keyboards including shallow, mobile keyboards and ergonomic keyboards with dual or curved space bars.

11 Claims, 4 Drawing Sheets

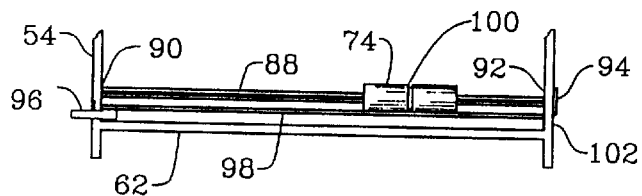
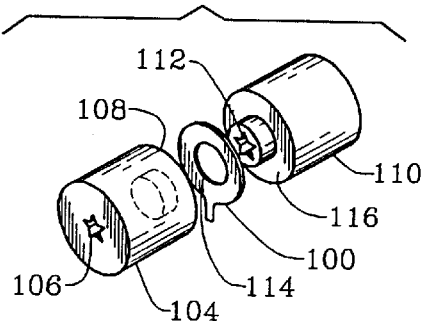
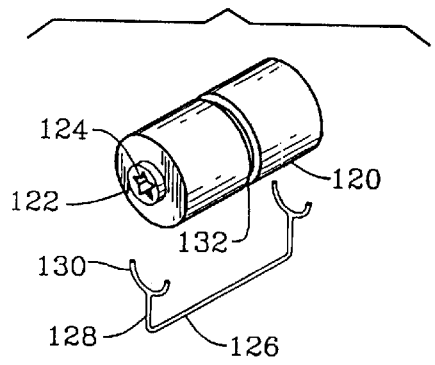
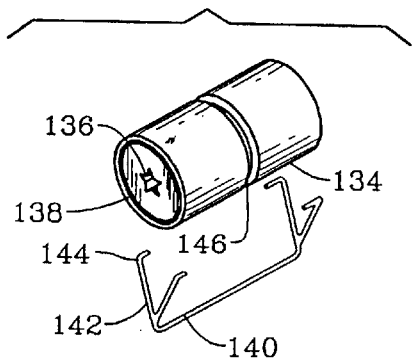
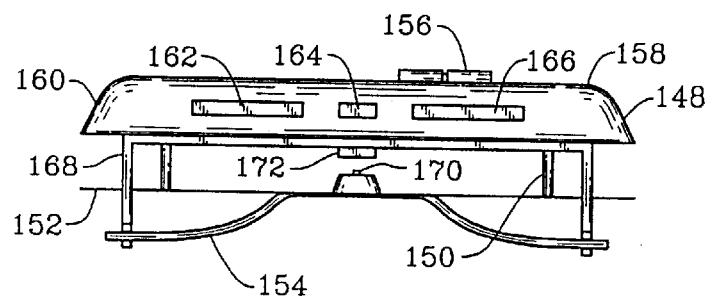
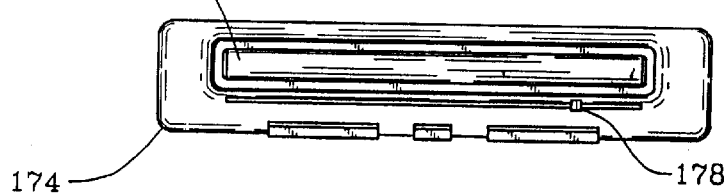

200   201

205

205
207   208

205
209

MULTIFUNCTION SPACE BAR FOR VIDEO SCREEN GRAPHICS CURSOR CONTROL

This application is a Continuation-in-part of U.S. Ser. No. 07/656,573, filed on Feb. 15, 1991, now U.S. Pat. No. 5,479,192.

FIELD OF THE INVENTION

The present invention relates generally to microprocessor based computer systems capable of video screen graphics cursor control and, more particularly, is directed to a new improved space bar designed to fit computer keyboards with minimal, if any, modification wherein the improved space bar is capable of conventional video screen cursor control in addition to a multifunction capability of controlling a video screen graphics cursor.

BACKGROUND OF THE INVENTION

A micro-processor based computer system has the unquestionable ability to manipulate data. Depending on the particulars of software development, manipulation can be internal as well as visually displayed for external control. Visual display is further exploited for interactive user collaboration whereby a means for changing the visual aspects of the display is employed. One such means is cursor control. The most recognized type of cursor control device being the "space bar," a term derived from the extensive use of typewriter-like keyboards for data processing. Data processing with a computer allows the use of advanced cursor control for cursor movement one character left, right, up, or down at a time. As the value of cursor control became evident, computer keyboard manufacturers provided a separate set of arrow keys designated for "manipulation" or "positioning" instead of "control."

Simple cursor control soon became inadequate as a need developed to quickly relocate the cursor with minimum key strokes. The inability to move the cursor quickly, accurately, or diagonally impeded software development. To overcome this limitation, a peripheral device called a "mouse" was created which disregarded the use of keyboard strokes and used a graphics cursor to enhance the methodology of the common cursor. As described in U.S. Pat. No. 4,801,931 by Schmidt, a single trackball is used to turn x and y axis rotational inputs, or both inputs simultaneously. By use of the mouse device, software programs have the flexibility to incorporate graphic cursor functionality into their design. For instance, a mouse allows an operator to "drag" an object across a video screen by first moving the graphic cursor to the object, depressing a mouse switch and dragging the object to any section on the screen. Thus, the conventional cursor was not displaced but enhanced by the graphic cursor allowing complex keyboard operations to be replaced by coordinated cursor positioning with a mouse.

Despite the advantages provided by the graphic cursor, the typical graphic positioner or mouse device remains an external peripheral device. The most efficient means for inputting data into a computer remains the touch typist operator and, despite the use of a mouse for graphic cursor positioning and data manipulation, any time a computer operator is required to remove a hand from the keyboard the operator's efficiency obviously decreases. In addition, the use of a mouse requires additional workspace as well as a special surface for optimum performance.

Portable computer manufactures must address these problems in an effort to retain the true portable nature of their computers. To provide video screen graphic cursor pointing, portable computers require either an external peripheral device, such as a mouse, or extensive keyboard modifications. When using an external peripheral device, the "portability" of a portable computer is considerably degraded. Attachment devices have been developed, or variations thereof eg. joystick, inverted ball, etc., and are currently on the market. U.S. Pat. No. 4,799,049 by Avila and U.S Pat. No. 4,937,564 by Oberg incorporate rotational and sliding movements into a keyboard embedded device for mouse emulation, yet still require a hand to be removed from the keyboard to operate the graphics cursor positioner. U.S. Pat. No. 4,823,634 by Culver directly addresses the problems associated with removal of the hand from the keyboard by utilizing thumb dexterity for control of a video screen graphic cursor. However, Culver is a keyboard embedded device and as such requires extensive modification to the keyboard. Further, such keyboard embedded devices do not address the optional usage of a co-resident, external video screen graphics cursor pointing device. Such a scheme would allow the user to employ either the keyboard embedded device or an external device, for graphics cursor positioning. Keyboard embedded devices are prone to accidental or inadvertent contact with the operators hand or wrist due to their position on the keyboard and provide no means for preventing the unintended operator contact. Further, the aforementioned devices do not address the inefficient use of the space bar, a carryover from manual typewriters.

The problems described are those which plague the use of graphic cursor control devices. While extensive efforts have been made toward resolving these problems, no satisfactory solution has heretofore been provided. Our invention is specifically designed to overcome the aforementioned problems and further provide a base for future software development needs. It is, therefore, to the effective resolution of these problems that the present invention is directed.

SUMMARY OF THE INVENTION

The principle object of the present invention is to provide a simple and reliable device or apparatus which overcomes the problems previously mentioned when using a graphic cursor control device.

The device is a multifunction space bar which operates in a fashion similar to that of a conventional space bar, but includes the additional functions of x-y axis graphic cursor control. The device is capable of supplying information signals determining rotational, sliding, and switch depression movements for control of video screen graphics cursor on a microprocessor based computer system having bus input control electronics for receipt of supply information signals. In addition, the multifunction space bar, hereinafter referred to as the "mouse bar" includes a plurality of function keys for mouse button emulation and future applications.

The mouse bar utilizes a positioner slidably secured to a cylindrical bar whereby rotation of the positioner generates a directional signal control of the graphic cursor along the y-axis. Movement of the positioner longitudinally along the length of the cylindrical bar generates a directional signal for control of the graphic cursor along the x-axis.

The multi-function space bar alternatively utilizes a touchpad, a thin, flexible touch sensitive panel, integrated into a cylindrical bar, instead of a slidably secured positioner, whereby rotation of the cylindrical bar generates a directional signal along the y axis. Touching or longitudinal movement in contact with the touchpad along the length of the cylindrical bar generates a directional or a positional signal for control of the graphic cursor along the x axis. The integrated touchpad can be utilized to generate control signals for y axis and x axis screen cursor positioning, or to generate control signals either for y axis or for x axis screen cursor positioning.

The mouse bar replaces a conventional space bar either as a new or after-market device. The device resembles a conventional space bar with two end surfaces, a front, top, and back surface. However, unlike the conventional space bar, a section of the mouse bar's top surface is removed. Positioned within the mouse bar structure is a rotatively movable elongated, striate, grooved or slotted cylindrical roller bar made from steel, plastic or other rigid material. The cylindrical roller bar rotates 360 degrees on frictionless bearings. At one end of the cylindrical roller bar is mounted a first motion detector output means operable by the rotatable movement of the cylindrical bar whereby the first motion detector supplies information signals to bus input control electronics for manipulation of the graphic cursor along the y-axis of a micro-processor based computer system.

A sleeve, hereinafter referred to as the "positioner" encompasses the cylindrical bar and is slidably secured to the cylindrical bar making it rotatively movable in unison with the cylindrical bar but capable of sliding the length of the bar with desirable resistance. The outer diameter of the positioner provides a surface area allowing an operator to rotate the positioner in unison with the cylindrical bar or slide it along the length of the cylindrical bar. The positioner surface becomes the control surface in a similar fashion as the contact point on a trackball. The inner diameter of the positioner has matching grooves or slots to the cylindrical bar with a critical tolerance dependent upon the type of positioner/cylindrical material composition with the primary purpose of preventing a lead lag situation during rotation due to lose tolerances. The slots or grooves mating the bar and positioner are of such smoothness and tolerance that the positioner is able to slide along the length of the bar with desirable resistance.

The positioner can be a single or multiple piece device as later described with a second motion detector output means operable by the longitudinal movement of the positioner whereby the second motion detector supplies information signals to bus input control electronics for manipulation of the graphic cursor along the x-axis of a micro-processor based computer system. Although other means for triggering a second motion detector are available such as described by U.S. Pat. No. 4,928,093 by Rahman, the present invention includes a means that is inexpensive to manufacture while providing second motion detector control. Location of the second motion sensing device at the opposite end of space bar from the first motion sensing device balances the weight distribution. By rotating the positioner and sliding it at the same time, both analog inputs are generated simultaneously creating a diagonal movement of the cursor.

The first and second motion sensing devices can be either self-enclosed mechanisms, or separable whereby the critical motion sensing device components are distributed about different sites on the internal surfaces of the space bar's support structure. When thusly distributed, it is possible to embed the motion sensing device components into other parts of the invention while eliminating movement linkage assemblies which complicate manufacture and may degrade the invention's reliability over a long period of use. This goal is further supported by the use of a touchpad because of its intrinsic motion or position sensing capability; no other external motion or position signal generating parts are needed for cursor control.

A plurality of switches are mounted on the front or ends of the mouse bar structure for mouse button toggling in a similar fashion as those used by a mouse. Locating the switches on the front of the mouse bar structure provides preferred stability and operator convenience. Toggling on the front of the mouse bar structure reduces or eliminates accidental depression of the space bar and associated toggling of the space bar switch. In addition it is recommended that one toggle be used as a centering toggle for the purpose of placing the graphic cursor along the y-axis by a single touch, similar to a home key. Further, the desirable operation of a center toggle switch includes an ability to turn the power to the mouse bar's graphic cursor controller on or off without disrupting the normal function of the space bar switch. This type of operation allows an operator to determine the graphic cursor position with the mouse bar while maintaining the touch typist stance, or to optionally disable the mouse bar's cursor positioning capability and to employ, as desired, another pointing device for cursor positioning. The preferred operation of the graphic cursor along the x-axis is best served when the horizontal pixel width of the video display screen is entirely mapped within the range of longitudinal positioner motion.

Accordingly, it is an object of the present invention to provide a graphic cursor control device that will fit within the confines of a conventional keyboard space bar location.

Another object of the present invention is to provide a means to simultaneously rotate and slide a graphic cursor positioner to simultaneously activate x and y axis output devices.

Still another object of the invention is to provide a means to activate x and y axis output devices without mechanical movement linkage assemblies.

Still another object of the present invention is to provide a plurality of switching toggles on a surface of the mouse bar which avoids space bar depression when applying force to said switches.

Yet another object of the invention is to designate a switch for powering the graphic cursor control portion of the mouse bar thus disabling or enabling the multifunction capability of the mouse bar.

Yet another object of the invention is to provide a replacement, or supplement, to external mouse devices.

Yet still another object of the instant invention is to provide a switch capable of Y-axis graphic cursor centering to avoid reverse thumb rolling.

Still another object of the instant invention is to provide a positioner capable of slidable movement along the longitudinal length of a cylindrical bar as well as rotatable movement of said cylindrical bar at any location of the positioner along said cylindrical bar.

Still another object of the invention is to provide a means to control screen cursor position without a slidable positioner by employing touch sensitive motion or location sensing devices.

Yet another object of the invention is to provide graphic screen cursor control over a wide range of space bar shapes, sizes and configurations, especially in mobile computers and ergonomically designed keyboards.

Still another object of the instant invention is to provide a location for additional switches for future programming usage at a location that does not require movement of either hand from the preferred touch typist stance.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 5 is an internal component view of the mouse bar illustrating the positioner and roller bar support;

FIG. 6 is an exploded view of the multi-piece positioner;

FIG. 7 is an exploded view of a second type of positioner using a U-shaped cradle;

FIG. 8 is an exploded view of a third type of positioner using a V-shaped cradle;

FIG. 9 is another embodiment of the invention using a fixed positioner;

FIG. 10 is another embodiment of the invention using independent x an y positioners.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
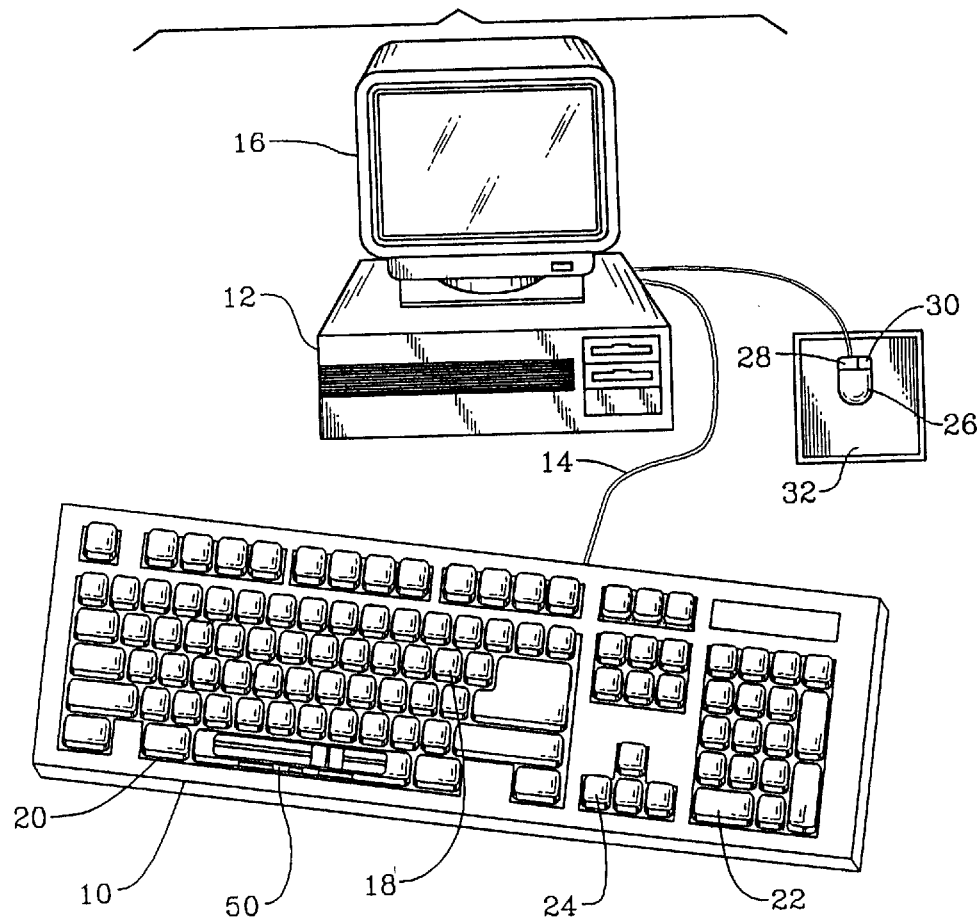
FIG. 1 is a perspective view of a typical computer system with a periperal mouse and the mouse bar occupying the traditional space bar location.

Referring now to the drawings, particularly to FIG. 1 in which a typical desktop computer is illustrated showing a conventional keyboard support structure 10 coupled to a processing unit 12 by cable 14. Video screen 16 provides a visual display of keyboard instructions or manipulated data. The mouse bar 50 is situated within type key section 18 with due notice given that the mouse bar fits within the confines of the keyboard framus opening 20 without modification of the keyboard support structure 10. Common cursor directional keys are shown as dual function arrow keys 22 and specific function arrow keys 24.

The mouse bar 50 operates as a conventional space bar but includes x-y axis graphic cursor control functions typically found on a peripheral mouse device 26 shown with left toggle switch 28, a right toggle switch 30, and a non-slip surface pad 32 for optimum trackball traction. It should be noted that the instant invention is not limited to a desktop computer system and may work on any computer system using a space bar including the shortened space bars found on laptop or notebook computers, as a supplement as well as the stated replacement of the peripheral mouse device.

Figure 2:
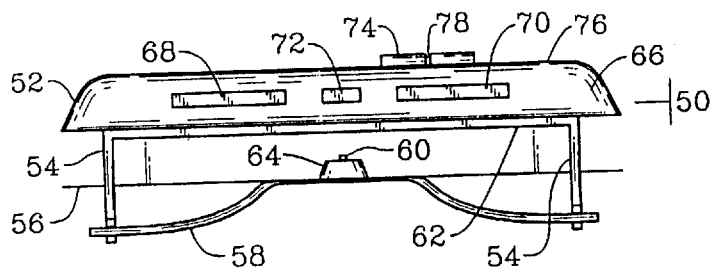
FIG. 2 is a front view of the mouse bar removed from the keyboard.

As illustrated by FIG. 2, the mouse bar is a direct replacement for conventional space bars either as a new product or for retro-fitted keyboards. The apparatus resembles a conventional space bar using a hollow support structure 52. End supports 54 extrude through a conventional keyboard baseplate 56 and attaches to a conventional torsion bar 58. Torsion bar 58 secures the mouse bar in position and ensures even toggling of conventional space bar switch 60 whether the left or right side of the mouse bar is depressed. In one method of manufacture of the mouse bar it has been found that a triggering rod 62 between supports 54 allows for switch 60 toggling thereby preventing modification of the switch 60 or conventional placement thereof. Despite the variety of keyboard manufacturers and torsion bar design, the supports 54 can be readily adapted to any keyboard design. Further modification of the support will not defeat the object of this invention. Rubber depression cushion 64 is placed over the spacebar switch 60 to provide an industry acceptable toggle feel or the cushion 64 can be placed around each support 54 thereby permitting the use of heavier components for mouse bar design using the depression cushion 64 as support. The front surface 66 of the mouse bar 50 faces the operator and houses a plurality of toggling switches as partially illustrated. Left toggle 68 and right toggle 70 emulate left and right mouse buttons. The size of toggle is a function of aesthetics and the number of function switches desired. Toggle depression is desirable to resemble a soft button or firm click action. Locating the switches on the front of the mouse bar structure provides preferred stability and operator convenience. Toggling on the front of the mouse bar structure reduces or eliminates accidental depression of the space bar and associated toggling of the space bar switch. A center toggle 72 has been found to be advantageous as a centering power control toggle. For instance, software programming allows the operator to single click the toggle and cause the graphic cursor to reposition itself in the middle of the y-axis. Double clicking causes the graphic cursor to reposition itself at the bottom of the y-axis. A prolonged depression or concomitant clicking disables the mouse bar's graphic cursor positioning capability leaving the mouse bar's sole operation that of a common space bar. Mouse bar disconnect allows an operator with limited thumb dexterity to use the device as proficiently as a touch typist. Center toggle 72 clicking affects the y-axis positioning only. While the buttons are described as centering and mouse emulation, other functions can be appointed to the switches as determined by the capabilities of the bus input control electronics and related software. A portion of the positioner 74 rises over the top surface 76 of the support structure 66 permitting the operator to know its position without visual sighting, a space 78 in the middle of the positioner 74 further assists in centering determination by feel.

Figure 4:
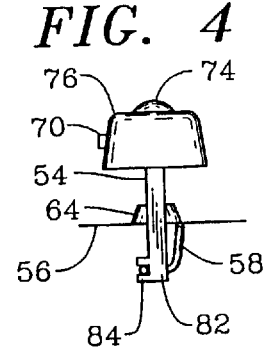
FIG. 4 is a side view of the mouse bar.
Figure 3:
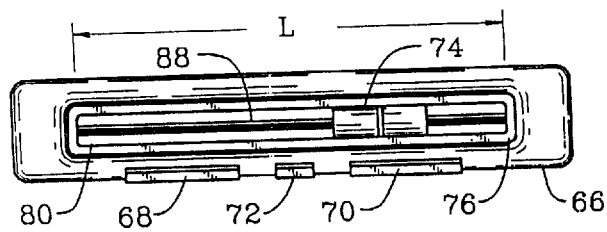
FIG. 3 is a top view of the mouse bar.

The view in FIG. 3 illustrates the top surface 76 of the support structure 66 with a mortise 80 spanning approximately the length L of the top surface 76 with a width between 4 and 15 mm exposing a top surface area of positioner 74. The positioner 74 is free to travel the longitudinal length L of the support structure. The width of the mortise 80 is of such tolerance as to prevent fingers or objects from sliding between the positioner and inside surface opposite top surface 76. The side view of FIG. 4 details the end support 54 utilizing a single bend 82 and coupling section 84 for attaching to existing torsion bar 58 beneath keyboard platform 56. A furcated bend in support 54 will not defeat the object of this invention. The positioner 74 extends slightly above the surface 76 of the mouse bar 50.

Now referring to FIG. 5 the cylindrical bar 88 is a rotatively movable elongated striated, grooved or slotted cylindrical roller bar 88 made from steel, plastic or other rigid material between 2 and 10 mm in diameter and is supported on the left side by a limited or frictionless bearing 90 integrated with support bar 54. Polishing of roller bar 88 near the ends of the bar reduce the need for bearing supports allowing a plastic sleeve or similar low friction support. The right side of the roller bar is similarly supported by bearing 92 and includes a means for generating a first output in relation to the rotation movement of said cylindrical bar by use of a direct mechanical connection to an electrical y-axis analog pickup device 94 such as an Alps switch or similar rotatable device capable of analog output. A preferred method of manufacturer incorporates the roller bar 88 and first output device 94 by directly coupling the roller bar to the first output device utilizing the device's bearings as the right side support.

The positioner 74 is manufactured from plastic, thermal plastic, or similar light-weight material that can retain a defined shape and encompasses the cylindrical bar 88 and is slidably secured to the cylindrical bar making it rotatively movable in unison with the cylindrical bar but allowed to slide the longitudinal length of the bar with minimal resistance. The positioner has an outer diameter between 5 and 15 mm including surface preparation and an inner diameter or aperture of the same size as the matching cylindrical bar with striations, grooves or slots with minimal tolerances to prevent a lead lag situation during rotation. The slots or grooves mating between the bar and positioner are of such smoothness and tolerances that the positioner is able to slide along the length of the bar with minimal resistance. The outer diameter of the positioner provides sufficient surface area to allow an operator to rotate or slide the positioner by use of either thumb with little effort. The positioner includes a means for generating a second output in relation to the longitudinal movement of said positioner by use of a direct mechanical connection to an electrical x-axis analog pickup device 96 such as an Alps switch or similar rotatable device capable of analog output. The first and second outputs supply information signals for a bus input control electronics for control of the graphics cursor along the x-y axis. By rotating of the positioner and sliding it at the same time, both x and y-axis analog inputs are accessed simultaneously creating a diagonal movement of the cursor. The preferred means for rotation control of the second output device 96 is by direct attachment to the positioner by flexible material 98 such as string, wire, plastic or similar elastic bands. A first end of the material 98 is attached to the positioner non-rotatable section 100 and wraps around a bushing or bearing 102 on the right side of the support 54, wrapping around the second output device 96 with the opposite end of the material 98 attached to a non-rotatable section 100. The placement of the second output device 96 at the opposite end of mouse bar from the first output device 94 balances the weight distribution. By use of dual slots in the left support 54 the second output device can be supported in vertical fashion similar to that as shown by the first output device 94 by use of dead bearings. Triggering rod 62 can be employed as an alignment bar to prevent the non-rotatable section 100 from moving out of position. The preferred operation of the graphic cursor along the x-axis is best served when the horizontal pixel width of the video display screen is entirely mapped within the range of longitudinal positioner motion. Use of two fingers allow mouse dragging by constant depression of a toggle button while the positioner is being moved.

FIG. 6 illustrates one form of positioner manufacture in which the positioner is shown with first portion 104 having a roller bar aperture 106 with enhanced grooves for pictorial purposes and a bore 108. The depth of bore 108 is slightly less than the combined width of non-rotatable section or disc 100 and the length of the second portion 110 and collar 112 leaving a space between first and second portions 104, 110 for non-rotatable section 100 to stabilize within, without undesirable friction. The mortise 114 of non-rotatable section 100 fits over collar 112. It should be noted that correct machining of collar 112, mortise 114 and inner surfaces 116, 118 and the two side surfaces of non-rotatable section 100 is required to prevent the non-rotatable section 100 from spinning with the positioner due to friction. Lack of sufficient machining can be overcome by use of a bearing in place of collar 112. The lower portion of non-rotatable section 100 extends beyond the positioner surface diameter for use in material 98 attachment. The overall diameter of the non-rotatable section is less than the overall diameter of the positioner providing the operator a feel for the center of the positioner by means of a detectable depression while further preventing the operator from touching the non-rotatable section. Although not shown, curvature mouse button emulation switches can be used on either side of the positioner.

Another type of positioner manufacture is illustrated in FIG. 7 in which the positioner 120 is made from a single piece of material with male extension ferrules 122 set on each side of said positioner and an aperture 124 placed through the longitudinal center of said positioner. For activation of the second output device, the non-rotatable section is a cradle formed from a single piece of material with a support structure 126 with axially spaced apart opposite ends 128 having identical profiles with U-shaped free ends 130 being positioned for disposition beneath each ferrule 122 of said positioner. The symmetrical U-shaped attachments 130 secure to the ferrules 122 providing a non-rotatable section for operation of the x-axis positioner. The positioner 120 may also include a depression 132 in the center of its surface for operator convenience.

Yet another type of positioner manufacture is illustrated in FIG. 8 in which a positioner 134 is made from a single piece of material with aperture 134 through the longitudinal center. On each end of the positioner is groove 136. For activation of the second output device, the non-rotatable section is a cradle formed from a single piece of material with a support structure 140 with axially spaced apart opposite ends having identical V-shaped profiles 142 with inwardly directed free ends 144 for insertion into groove 138. The positioner 134 may also include a depression 146 in the center of its surface for operator convenience.

FIG. 9 shows another embodiment of the invention in which the device resembles a conventional space bar using a hollow support structure 148. The positioner and cylindrical rod are similar to that as described in FIG. 5 however, the end supports 150 that extrude through the conventional keyboard baseplate 152 do not attach to conventional torsion bar 154 as in FIG. 5. In this manufacture, horizontal height of the x-y graphic cursor positioner 156 remains fixed on end supports 150 allowing the hollow support structure 148 to be depressed 158 around the positioner 156 on conventional support legs 168. The front surface 160 of the mouse bar faces the operator and may house the toggling switches as partially illustrated by 162, 164, and 166. Although not illustrated, the cylindrical bar remains below the surface of the support structure even in its depressed position to avoid interference with operator space bar toggling. Space bar switch 170 is toggled by cross support 172 in the depressed mode. A center toggling switch is still advantageous as a centering power control toggle but mouse bar disconnect is not needed for the space bar movement will not affect the graphic cursor control unless the device is used as a supplemental pointing device.

FIG. 10 shows a top view of still a further embodiment where the device resembles a conventional space bar using a hollow support structure 174. As previously mentioned the cylindrical rod 176 is used to control the y-axis output device, however, in this embodiment the cylindrical bar is rotated by direct finger contact with the surface of the bar. The positioner in this embodiment is a tab 178 that extends from the top of the support structure on either side of the cylindrical bar and is slidable along the longitudinal length of the cylindrical bar for control of the x-axis output device.

Figure 11:
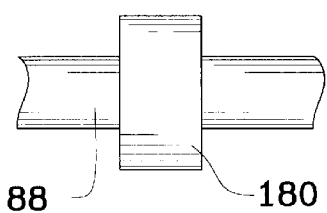
FIG. 11 is a top view of a y axis motion sensing device component mounted about the cylindrical bar near either or both ends of the bar.
Figure 12A:
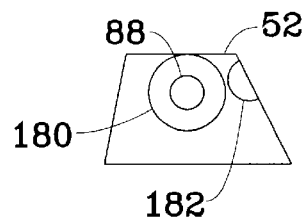
FIGS. 12 (A) and (B) are side views of corresponding y axis motion sensing device components mounted on an internal surface of the space bar support structure opposite the component depicted in FIG. 11.
Figure 12B:
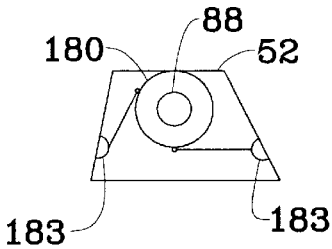

FIGS. 11, 12(A) and 12(B) illustrate how the y axis motion sensing device components can be mounted on other elements of the multi-function space bar thereby eliminating the normal y axis motion sensing device enclosure or housing of analog pickup device 94. Many of the weight, volume and mechanical attachment considerations regarding the use of 94 can be overcome by placing the critical motion sensing components on other parts already present. From a top view as shown in FIG. 11, cylindrical bar 88 can support, near either or both ends of the bar, a narrow cylinder of larger diameter 180. This narrow cylinder(s) usually will be placed as close as possible to the end(s) so as to not restrict the longitudinal range of motion allocated for the x axis motion or position sensing device. A motion sensing device component can be mounted radially along the curved external face of 180. FIG. 12(A) shows a side view cross section of this arrangement inside of the space bar support structure 52. Another critical motion sensing device component 182 will be mounted on, or embedded into, the internal surface of the space bar support structure in an orientation which provides necessary proximity to the corresponding critical motion sensing component on 180. The internal top or side surfaces of the space bar support structure provide varied opportunity for locating such components. FIG. 12(B) shows another possible arrangement wherein simple mounting extensions provide physical contact, as necessary, between critical motion sensing components 180 and 183. Also depicted by FIG. 12(B) is the use of multiple mounting sites useful for employing several motion sensing components for optimal motion sensing.

Figure 13:
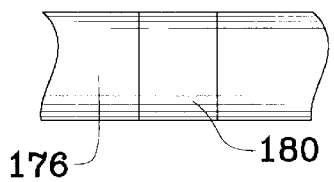
FIG. 13 is a top view of a y axis motion sensing device component flush mounted on a large diameter cylindrical bar near either or both ends of the bar when a slidable positioner is not employed.
Figure 14A:
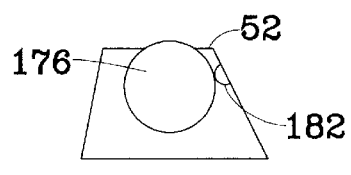
FIGS. 14 (A) and (B) are side views of corresponding y axis motion sensing device components mounted on an internal surface of the space bar support structure opposite the component depicted in FIG. 13.
Figure 14B:
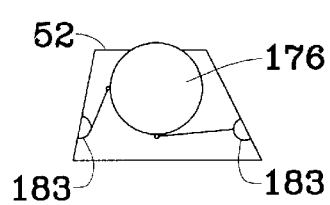

FIGS. 13, 14(A) and 14(B) illustrate a y axis motion sensing device embodiment similar to that shown by FIGS. 11, 12(A) and 12(B). In this instance, however, the cylindrical bar 88 and the positioner 74 are eliminated in favor of a larger diameter cylindrical bar which is directly rotated by the user's finger or thumb 176 as portrayed in FIG. 10. The diameters of 176 and 180 differ only to the extent necessary to insure that the critical motion sensing component mounted on the curved surface of 180 is properly situated for correct operation. For some motion sensing devices, the relevant motion sensing component may be contained within an arbitrarily thin film or flexible panel which can be mounted on, or embedded into, the exterior curved surface of the large diameter cylindrical bar 176 thereby rendering unnecessary other cylindrical structures such as 180. FIGS. 14(A) and 14(B) portray side view cross sections of the same motion sensing device component placement as described previously for FIGS. 12(A) and 12(B), with the exception of different spacing opportunities stemming from the possibly larger diameter of the cylindrical bar.

Figure 15:
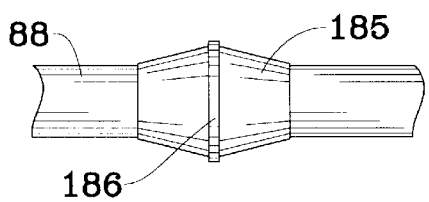
FIG. 15 is a top view of an x axis motion sensing device component mounted radially about the positioner.
Figure 16:
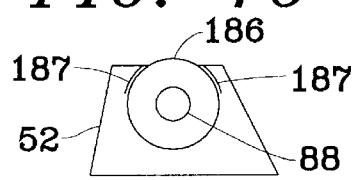
FIG. 16 is a side view of corresponding x axis motion sensing device component mounted on up to two internal space bar surface extensions which span most of the length of the space bar opposite the component depicted in FIG. 15.

FIGS. 15 and 16 illustrate how the x axis motion sensing device components can be mounted on other elements of the multi-function space bar thereby eliminating the normal x axis motion sensing device enclosure or housing of analog pickup device 96. Also rendered needless in this embodiment are the elements of a mechanical linkage assembly which transmits the translational motion of the positioner 74 as rotational motion to the x axis analog pickup device. This linkage assembly includes the non-rotatable section 100, flexible material 98 and bushing or bearing 102, all as shown in FIG. 5 and the similar elements of FIGS. 7 and 8 where other positioner embodiments are shown. FIG. 15 depicts a possible positioner embodiment with the top view of a tapered positioner 185 slidably secured to the cylindrical bar 88. As with previously described positioner embodiments, this positioner is attached to the cylindrical bar in such a manner that prevents the positioner from rotating relative to the cylindrical bar. All rotational movement of the positioner is transmitted to the cylindrical bar; 185 and 88 necessarily rotate in unison. Mounted radially around the center of the positioner is a critical motion sensing device component 186. The critical motion sensing component protrudes outward from the center of the positioner beyond the extent of any other portion of the positioner in all directions along the positioner's circumference at its longitudinal center. Such a protrusion will provide any needed proximity, for proper motion sensing operation, with the corresponding critical motion sensing component(s) mounted within the space bar support structure as shown in FIG. 16. FIG. 16 shows a side view cross section of the critical x axis motion sensing components at the point where a motion sensing component, 186, is mounted on the positioner 185 within the space bar support structure 52. Up to two internal space bar extension surfaces 187 provide a structure for mounting a critical motion sensing device component opposite the sensing component mounted on the positioner. The extension surfaces extend longitudinally along the space bar to the extent necessary to encompass the entire range of possible positioner lateral motion as defined by the mortise 80 shown in FIG. 3. This range of lateral motion must exclude a small span near each end of the space bar to allow space for mounting y axis motion sensing components described above. If necessary, the extension surfaces can be curved to match the curvature of the positioner borne motion sensing component to provide maximum surface proximity or contact between the opposing critical motion sensing components. The diameter and width of sensing component 186 and the number, length and curvature of the extension surfaces 187 can be varied to achieve the optimum amount of surface contact and friction between the opposing critical sensing components when direct contact is necessary. Further, the dimensions of motion sensing component 186 can adjusted for optimal motion sensing operation to such an extent that the predominant shape and character of the positioner 185 is largely determined by presence of this motion sensing component. For some motion sensing devices, the relevant motion sensing component may be contained within an arbitrarily thin film or flexible panel which can be mounted on, or embedded into, the extension surfaces.

Figure 17A:
FIGS. 17(A) and (B) are top views of the large diameter cylindrical bar with a touchpad circumscribed about the bar in replacement of the positioner.

FIGS. 17(A) and (B) illustrate how to achieve video screen cursor control without a slidable positioner. These figures show top views of two cylindrical bars for use with a circumscribed touch sensitive motion or position sensing device, or touchpad. The diameter of the cylindrical bar 190 varies longitudinally. The largest portion of the cylindrical bar's span will be exposed through mortise 80 to allow for direct manipulation of the cylindrical bar by the user's thumb or finger similar to cylindrical bar 176 depicted in FIG. 10. When accounting for the thickness of the touchpad, the diameter over this span must be sufficiently large for this purpose. Both ends of the cylindrical bar have a smaller diameter to allow the cylindrical bar's external curved surface over these spans to be enclosed within the normal space bar structure 52. only the cylindrical bar span to be occupied by the touchpad requires exposure to the user through the mortise. The touchpad entails a thin, flexible panel of rectangular shape with electrical signal lines proceeding from the panel's perimeter. The touchpad panel 191 is mounted so as to circumscribe the external, large diameter, curved surface of the cylindrical bar. The cylindrical bar provides for a hollow channel extending longitudinally through the bar to supply a pathway for the electrical signal lines. Small adjustments to the contour of the cylindrical bar's external curved surface provide for a smooth seam where the sides of the touchpad meet as it is mounted on the bar 190. At the seam, other modifications to the cylindrical bar's external surface supply an entry route to the interior hollow channel for the electrical signal lines.

Figure 17B:
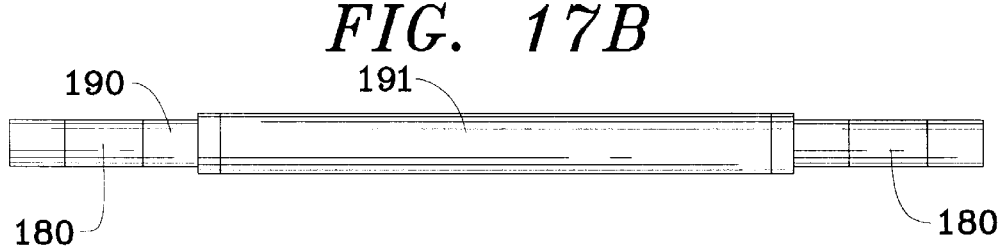

A touchpad typically supplies electrical signals for both the first, vertical y axis, and the second, horizontal x axis, outputs. FIG. 17(A) shows the cylindrical bar embodiment to provide both y axis and x axis screen cursor placement with the touchpad. Touchpad 191 generates the first and the second output electrical signals. As the user rotates the cylindrical bar and laterally employs a finger or thumb, the entire surface of the touchpad is available for contact. The design of the input control electronics determines whether the touchpad generated signals are processed as either motion sensing or position sensing. When the generated signals are processed as position sensing, the input control electronics must include the capacity for mapping video display locations of varying resolutions onto the surface of the touchpad. FIG. 17(B) shows the cylindrical bar embodiment to provide only x axis screen cursor placement with the circumscribed touchpad and to provide y axis screen cursor placement with distributed motion sensing device components 180 and either 182 or 183 as described in FIGS. 13, 14(A) and 14(B). In this instance, the touchpad 191 generates the second output signal only. This embodiment eliminates possible difficulties arising from different methods employed by the user to rotate the bar. Since the second output is generated by the touchpad, however, the slidable positioner and any attendant mechanical movement linkage assemblies remain unnecessary.

Another embodiment of the instant invention employs a touchpad alone without a cylindrical bar to provide both the first and second output signals. The touchpad is either mounted directly onto or imbedded into the top surface of the space bar support structure. Without the rotating cylindrical bar, the touchpad's dimension along the smaller dimension of the space bar's top surface is considerably restricted, however. Electrical signal lines for the touchpad are directed along the interior surfaces of the space bar support structure. The cylindrical bar, the rotatively slidable positioner, mechanical motion sensing devices and their attendant mounting apparatus are entirely absent in this touchpad-only arrangement.

No intrinsic or design attribute of either the first and second generating means or any other elements of the instant invention which directly or indirectly contribute to the operation of the first and second generating means determines the processing and interpretation of the generated signals. Rather, the input control electronics which receives the output of the first and second generating means determines how the generated signals are translated into movements of the video screen graphic cursor. Although it is considered intuitive to relate rotational motion of the slidable positioner or of the cylindrical bar to vertical y axis location manipulation of the screen cursor, such rotational motion could instead be translated by the input control electronics into horizontal x axis screen cursor location manipulation. And, although it is considered intuitive to relate translational thumb or finger movement longitudinally along the space bar to horizontal x axis location manipulation of the screen cursor, such translational motion could instead be translated into vertical y axis screen cursor location manipulation. This flexibility afforded by the input control electronics to process and interpret the output of the first and second generated means in conjunction with the use of distributed motion sensing components and/or a touchpad motion or position sensing device enables the instant invention to be used in space bars which vary considerably by shape, size and configuration for a broad spectrum of purposes.

Mobile computers typically possess keyboards with short travel keys. Such keyboards have space bar support structures that include front, back and side surfaces which usually extend 5–8 mm below the support structure's top surface. These shallow space bars can more practically accommodate the instant invention when a combination of distributed motion sensing components and touchpad motion or location sensing devices are mounted about an appropriately size cylindrical bar. Such an embodiment relies on a cylindrical bar as illustrated in FIG. 17(B). Numerous keyboards of current manufacture employ special purpose keys located to either or both sides of the space bar. With less space available for the space bar, these keyboards include shortened space bars. Such shortened space bar support structures can possess longitudinal dimensions of 3 inches or less. Again, distributed motion sensing components, touchpad motion or location sensing devices and adjustments to the input control electronics provide the means for employing the instant invention in such space bar support structures.

Figure 18:
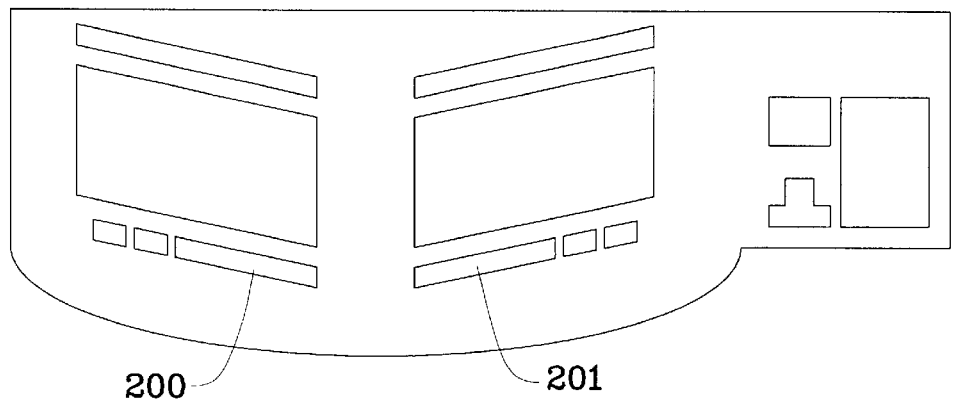
FIG. 18 is a top view of an ergonomically designed keyboard outline employing dual space bars.

Some ergonomically designed keyboards include dual space bars. Such keyboards possess two space bars, each of which perform the same function. FIG. 18 shows the top view of an outline of an ergonomically designed keyboard employing dual space bars. This type of keyboard includes a left space bar 200 and a right space bar 201. Such keyboards offer numerous possibilities for including various configurations of the instant invention. Such keyboards are capable of including the instant invention whereby the instant invention is located in either the left space bar or the right space bar. Also, such keyboards are capable of including the instant invention whereby the instant invention is located in both the left space bar and the right space bar. With a left and a right multi-function space bar, a total of four output signals originating from two sets of first and second generating means become available for manipulating the video screen cursor. Many possible combinations arise from either ignoring, discretely using or collaboratively using each of the signals originating from the two sets of first and second generating means. It is possible to implement the input control electronics to encompass two modes of operation.

In the first mode of dual multi-function space bar operation, the input control electronics discretely uses the output signals from the generating means of only one multi-function space bar and ignores the output signals from the generating means of the other multi-function space bar. The input control electronics includes a means to determine which set of generating means output signals to use and which to ignore. The determination of which set of generating means output signals to use is either static or dynamic. When the determination is static, such determination is made before a particular multi-function space bar usage instance. Such a static determination is typically made at the user's discretion. When the determination is dynamic, such determination is made during a particular multi-function space bar usage instance. When such determination is dynamic, the input control electronics includes a further means for selecting on the basis of predetermined criteria which set of first and second generating means output signals to use under ambiguous circumstances. A possible criterion for selecting which multi-function space bar's set of generated signals to process during a particular usage instance is to use only that set of signals from the multi-function space bar from which the first signal is received.

In the second mode of dual multi-function space bar operation, the input control electronics discretely or collaboratively uses the output signals from the generating means of either or both multi-function space bars. In this operational mode, each of the four generating means can have one of five roles in manipulating the video screen cursor: its output signal is ignored, its output signal is discretely used for y axis screen cursor manipulation, its output signal is discretely used for x axis screen cursor manipulation, its output signal is collaboratively used for y axis screen cursor manipulation, its output signal is collaboratively used for x axis screen cursor manipulation. When a generating means' output signal is used discretely, only its signal is used for that particular role. When a generating means' output signal is used collaboratively, its output signal is used in combination with the output signals of one or more of the other three generating means. The input control electronics includes a means for determining which of the five generating means roles to apply when processing the output signals from each of the four generating means. The determination of which generating means role to apply to each of the four generating means is static or dynamic. When the determination is static, such determination is made before a particular multi-function space bar usage instance. Such a static determination is typically made at the user's discretion. When the determination is dynamic, such determination is made during a particular multi-function space bar usage instance. When such determination is dynamic, the input control electronics includes a further means for selecting on the basis of predetermined criteria which generating means role to apply under ambiguous circumstances. When such applied generating means role is collaborative, the input control electronics includes a means for establishing the nature of such collaboration. Multiple and various usage schemes are possible in this operational mode. One usage scheme discretely employs the rotational motion of the left multi-function space bar for y axis screen cursor manipulation and discretely employs the rotational motion of the right multi-function space bar for x axis screen cursor manipulation. Another usage scheme discretely employs the translational motion of the right multi-function space bar for y axis screen cursor manipulation and discretely employs the translational motion of the left multi-function space bar for x axis screen cursor manipulation. These are but two of the numerous and varied usage schemes possible in this operational mode.

Another embodiment of the instant invention for use with the dual space bar keyboard of FIG. 18 entails locating only one means of motion or position detection in each of the dual space bars. In one configuration, the first generating means is in the left space bar 200 while the second generating means is in the right space bar 201. In another configuration, the first generating means is in the right space bar while the second generating means is in the left space bar. Yet another configuration allows the input control electronics to determine, through a changeable, user operated means, how to interpret the generated signals originating from each of the multi-function space bars: as either the first generating means for y axis screen cursor manipulation or the second generating means for x axis screen cursor manipulation. In this embodiment, each of the dual space bars possesses either a cylindrical bar for direct contact by the user, a cylindrical bar with a circumscribed touchpad, a cylindrical bar with a slidable positioner or a touchpad only. Each of these 4 motion or position detection arrangements are combinable in any manner among the dual space bars where the rotational or translational motion applied thereto is interpreted by the input control electronics as either the first generating means or the second generating means. To use a touchpad alone without a cylindrical bar, the touchpad is either mounted directly onto or imbedded into the top surface of the space bar support structure. Electrical signal lines for the touchpad are directed along the interior surfaces of the space bar support structure. The cylindrical bar, the rotatively slidable positioner, mechanical motion sensing devices and their attendant mounting apparatus are entirely absent in this touchpad-only arrangement.

Figure 19:
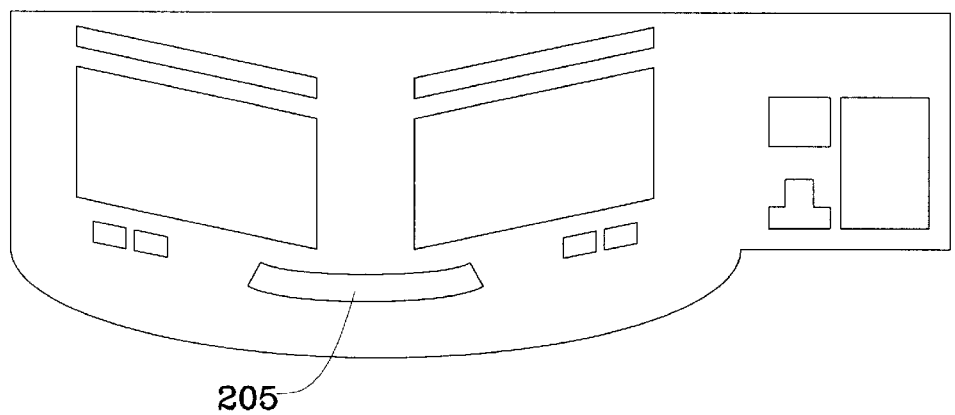
FIG. 19 is a top view of an ergonomically designed keyboard outline employing a curved space bar.
Figure 20A:
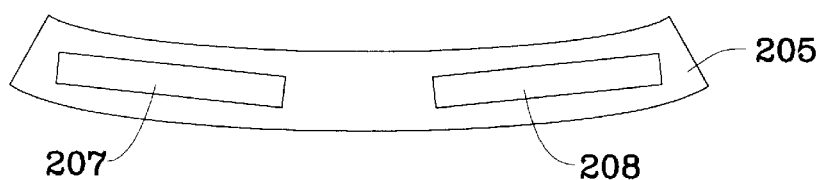
FIGS. 20 (A) and (B) are top views of a curved space bar illustrating possible motion or position sensor locations.
Figure 20B:
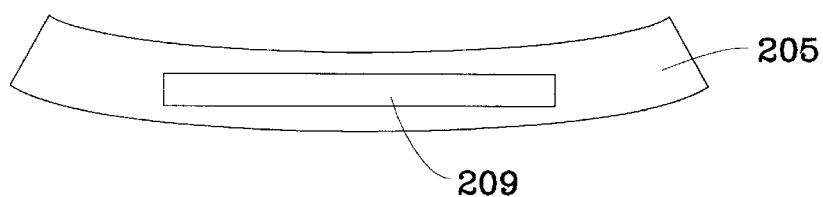

Some ergonomically designed keyboards include a single curved space bar. FIG. 19 shows the top view of an outline of an ergonomically designed keyboard employing a curved space bar 205. Placing the instant invention in a curved space bar requires adjusting the span of the cylindrical bars 88, 176 or 190 and/or the touchpad 191 so that their lengths will fit within a region of the curved space bar so as to not protrude beyond the front or back surfaces of the curved space bar support structure. Shortening the span of the instant invention further entails adjusting the means for mounting one or both ends of the cylindrical bar in the instances where the one or both ends do not longitudinally span the length of the space bar support structure. Alternate means for cylindrical bar mounting include modifications to the internal surfaces of the space bar support structure as well as possible modifications to the location of supports 54. FIG. 20(A) shows a curved space bar 205 containing two motion or position sensor sets 207 and 208 where each motion or position sensor set includes either the first generating means, the second generating means or both the first and second generating means. FIG. 20(A) illustrates a single curved space bar, which apart from mechanical and structural mounting design considerations, is functionally equivalent to the dual space bar keyboard in FIG. 18. All of the possible motion or position detection means embodiments described in relation to such a dual space bar keyboard also pertain to this instance of a curved multi-function space bar. FIG. 20(B) shows curved space bar 205 containing a single motion or position sensor set. In this instance, the motion or position sensor set does not span the length of the space bar so that it is entirely contained within the front and back surfaces of 205. The longitudinal dimension of this motion or position sensor set is determined by the curvature of the space bar. FIG. 20(B) shows a curved space bar 205 containing a single motion or position sensor set 209 where the motion or position sensor sets includes both the first and second generating means. FIG. 20(B) illustrates a single curved space bar, which apart from mechanical and structural mounting design considerations, is functionally equivalent to any single space bar keyboard described above. All of the possible motion or position detection means embodiments described in relation to such single space bar keyboards also pertain to this instance of a curved multi-function space bar.

It is believed that a careful consideration of the specification taken in conjunction with the views of the drawing will enable the reader to obtain a clear and comprehensive understanding of the construction, the features and advantages and mode of use. Under the circumstances a more restricted description is deemed to be unnecessary.

It is to be understood that while we have illustrated and described certain forms of the invention, it is not to be limited to the specific forms or arrangement of parts herein describe and shown. It will be apparent to those skilled in the art that various changes may be made without departing from the scope of the invention and the invention is not to be considered limited to what is shown in the drawings and described in the specification.

What is claimed as new and desire to secure by Letters Patent of the United States is:

1. A multi-function space bar device occupying the traditional single position space bar location or each of the dual position space bar locations with said device capable of supplying information signals determining rotational, sliding, and switch depression movements for control of a video screen graphics cursor on a microprocessor based computer system having input control electronics for receipt of information signals, said device comprising:

at least one space bar support structure, each said space bar support structure having a front, top, and back surface with first and second ends, said top surface having an elongated cylindrical slot along the longitudinal length thereof;

a rotatively movable elongated cylindrical bar positioned spanning the first end and second end of said support structure with a portion of said cylindrical bar protruding above said elongated slot;

means for generating a first output in relation to the rotational movement of said cylindrical bar for control of a graphics cursor along a vertical Y-axis of a video screen; and a touch sensitive panel integrated into said cylindrical bar for use in generating a second output in relation to a finger movement along the longitudinal length of said cylindrical bar for control of a graphics cursor along a horizontal X-axis of a video screen;

whereby said first and second outputs supply informational signals to said input control electronics for manipulation of said video screen graphics cursor on said microprocessor based system.

2. The multi-function space bar device of claim 1 wherein said device as implemented on each of said dual position space bar allows for X-axis and Y-axis control through input signals from either of said space bar devices.

3. The multi-function space bar device of claim 1 wherein said device as implemented on each said dual position space bar allows for X-axis and Y-axis control through input signals from either of said space bar devices.

4. The multi-function space bar of device claim 1 wherein a plurality of switches are located along the front of said support structure providing mouse emulation functions.

5. The multi-function space bar device of claim 1 wherein a plurality of switches are located along the front of said support structure providing mouse emulation functions.

6. A multi-function space bar device occupying each of two dual position space bar locations with each said device capable of supplying information signals determining sliding finger position and switch depression movements for control of a video screen graphics cursor on a microprocessor based computer system having input control electronics for receipt of information signals, said device comprising:

dual space bar support structures, the first and second of said space bar support structures each having a front, top, and back surfaces with first and second ends, said top surface having a sensor means longitudinally spanning said first and second ends;

a first touch sensitive panel integrated into said first space bar for use in generating a first output from said first space bar sensor in relation to a finger movement along the longitudinal length of said space bar for control of a graphics cursor along a vertical Y-axis of a video screen;

a first touch sensitive panel integrated into said first space bar for use in generating a second output from said second space bar sensor in relation to a finger movement along the longitudinal length of said cylindrical bar for control of a graphics cursor along a horizontal X-axis of a video screen;

whereby said first and second outputs supply informational signals to said input control electronics for manipulation of said video screen graphics cursor on said microprocessor based system.

7. The multi-function space bar device of claim 6 wherein a plurality of switches are located along the front of said support structure providing mouse emulation functions.

8. The multi-function space bar device of claim 6 wherein said sensor means includes a touch sensitive panel integrated into said space bar surface.

9. A multi-function space bar device occupying the traditional single position space bar location or each of the dual position space bar locations with said device capable of supplying information signals determining rotational, sliding, and switch depression movements for control of a video screen graphics cursor on a microprocessor based computer system having input control electronics for receipt of information signals, said device comprising:

at least one space bar support structure, each said space bar support structure having a front, top, and back surface with first and second ends, said top surface having a sensor means longitudinally spanning said first and second ends;

means for generating a first output from said sensor means in relation to vertical sliding movement of a user's finger along the vertical length of said sensor for control of a graphics cursor along a vertical Y-axis of a video screen; and means for generating a second output from said sensor means in relation to horizontal sliding movement of a user's finger movement along the longitudinal length of said sensor for control of a graphics cursor along a horizontal X-axis of a video screen;

whereby said first and second outputs supply informational signals to said input control electronics for manipulation of said video screen graphics cursor on said microprocessor based system.

10. The multi-function space bar of claim 9 wherein a plurality of switches are located along the front of said support structure providing mouse emulation functions.

11. The multi-function space bar device of claim 9 wherein said sensor means includes a touch sensitive panel integrated into said space bar surface.

\* \* \* \* \*